July 22, 1941.  E. MEYER ET AL  2,249,972
FOOD PREPARING DEVICE
Filed Oct. 21, 1940  2 Sheets-Sheet 1
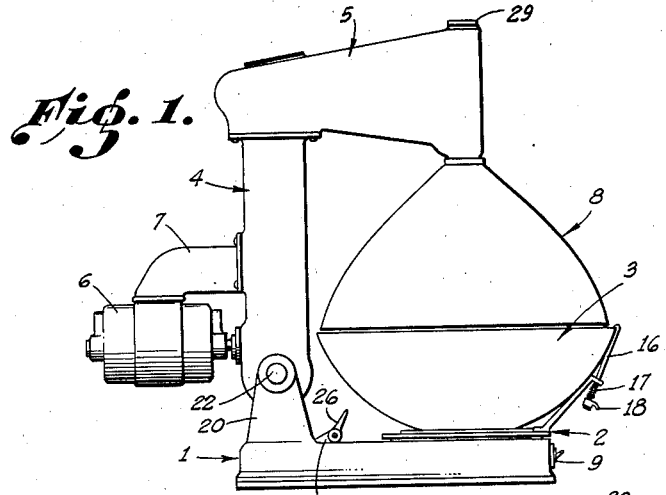
Fig. 1.
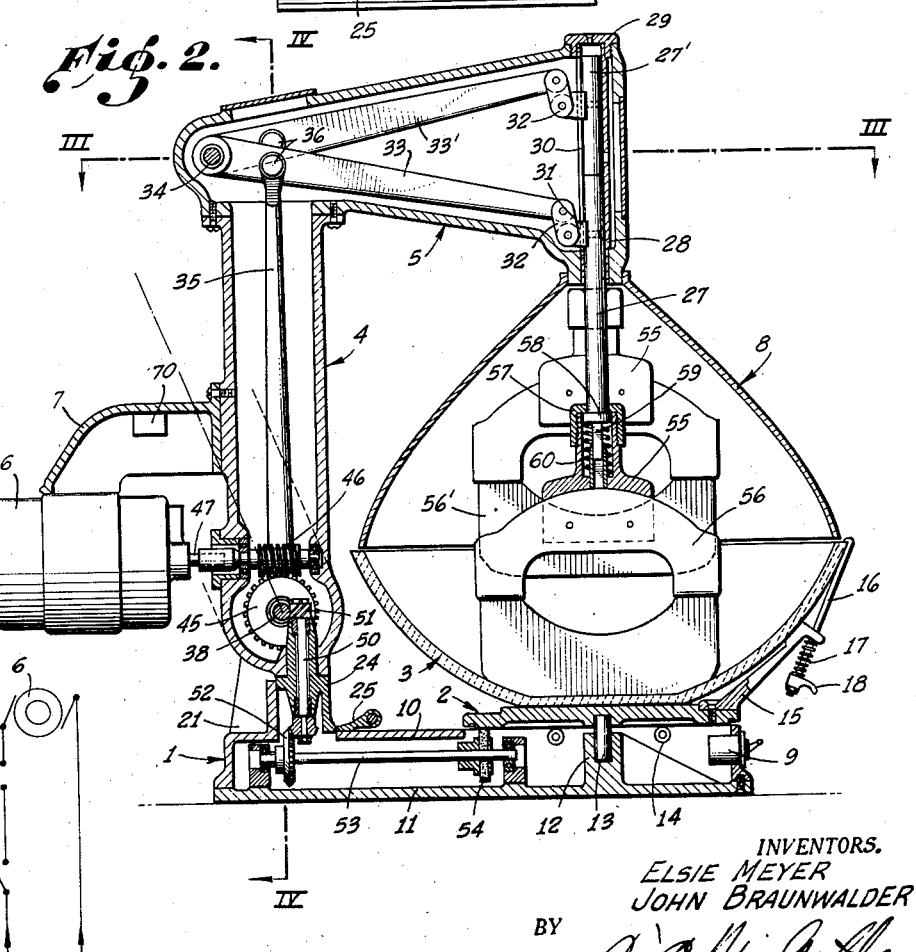
Fig. 2.
Fig. 6.
INVENTORS.
ELSIE MEYER
JOHN BRAUNWALDER
BY
ATTORNEY.

July 22, 1941.     E. MEYER ET AL     2,249,972
FOOD PREPARING DEVICE
Filed Oct. 21, 1940     2 Sheets-Sheet 2
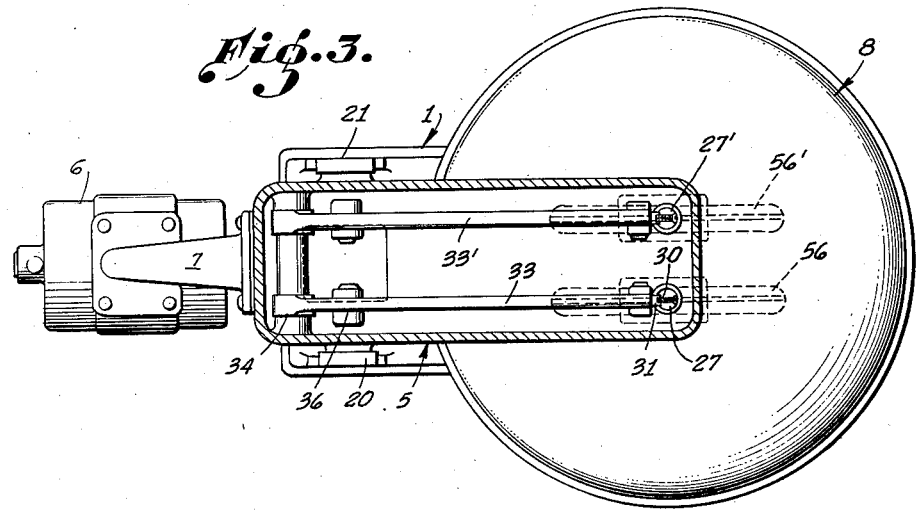
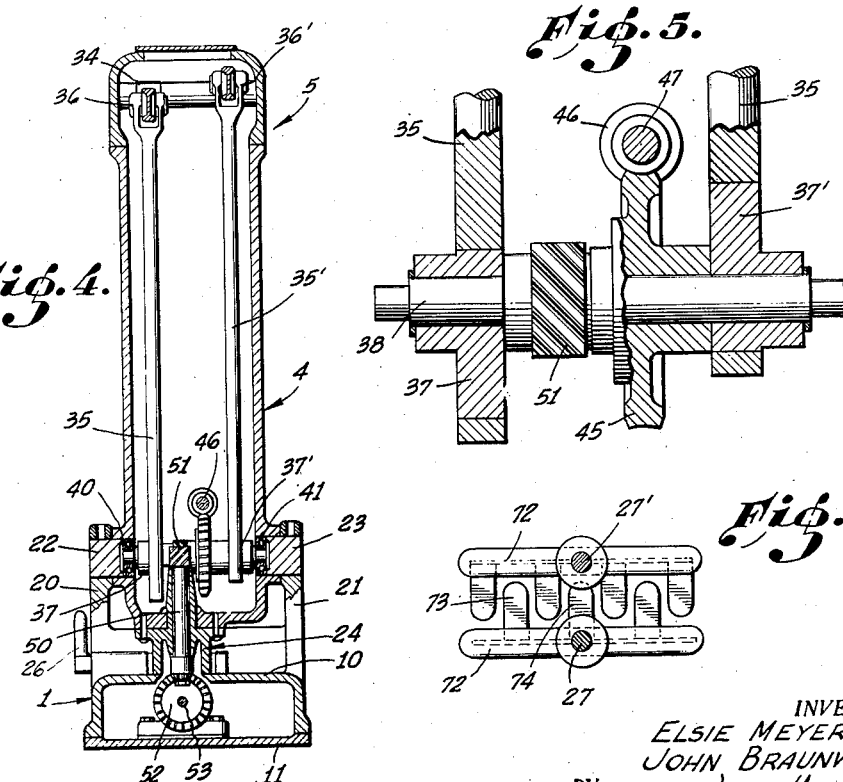
INVENTORS.
ELSIE MEYER
JOHN BRAUNWALDER
BY
ATTORNEY.

Patented July 22, 1941

2,249,972

UNITED STATES PATENT OFFICE 2,249,972

FOOD PREPARING DEVICE

Elsie Meyer and John Braunwalder, Los Angeles, Calif.; said Braunwalder assignor to said Meyer Application October 21, 1940, Serial No. 362,000

7 Claims. (Cl. 146—69)

This invention pertains to an improved portable food preparing device capable of being employed in chopping, mashing, beating and otherwise treating food stuffs.

A number of different devices for the preparation of food stuffs have been previously made and described. Practically all of these prior devices involve rotatable beaters and in the event it is desired to reduce a fleshy substance such as meat to a state of fine division, it is necessary to pass such meat through a grinder, grinding attachments being supplied with many of the devices now on the market. The grinding of meat results in an expression of many of the essential juices so that the food value of the ground product is greatly impaired since the juices are lost and are not retained within the meat. This difficulty can be obviated in the event the meat or fish is chopped but prior chopping devices have either been bulky or they have not been satisfactory in that they did not permit rapid and effective chopping of relatively tough or resilient materials.

The present invention is directed toward a device for preparing food stuffs in which the actuating elements may be chopping knives, blunt mashers, or mixing fingers, these various tools performing a rapid reciprocation during the chopping, mashing, whipping or beating operation.

The device of the present invention, moreover, embodies a number of features whereby its operation is rendered safe and certain and the entire unit is so constructed as to be economical in production, relatively light in weight, easy to clean and adjust, and sufficiently strong so as to completely chop all food stuffs normally subjected to a chopping operation by hand.

Generally stated, the device in its preferred embodiment comprises a base and a drive housing extending upwardly from the base and horizontally above a suitable support for a bowl or other receptacle in which the food stuff is chopped or prepared. Means are provided whereby the rotary action of a drive motor is converted into a high velocity rapid reciprocation of the tools which, as previously stated, may comprise knives, beaters, mashers or the like. In order to prevent injury and facilitate rapid use of the device, the entire drive housing is pivotally mounted on the base so that it may be tilted and thereby move the tools out of operating relation with the bowl or other container. Means are also provided whereby the driving motor is automatically disconnected whenever the drive housing is tilted, thereby making certain that the operator is not injured by the rapidly moving tools. The bowl or other container may be caused to rotate during operation so as to continuously present a fresh surface to the action of the tools.

An object of the present invention, therefore, is to provide a portable food preparing device of simple and effective construction.

Another object is to provide a food preparing device which, by reason of interchangeable tools, may be used for chopping, beating, mashing and other operations ordinarily desired in the preparation of food stuffs.

A still further object of the invention is to provide a food preparing device equipped with means whereby injury to the operator is positively prevented.

These and other objects, advantages, uses and modifications of the invention will become apparent to those skilled in the art from the following detailed description of an exemplary form of the invention. In order to facilitate understanding, reference will be had to the appended drawings, in which:

Fig. 1 is a side elevation of one form of device embodying the present invention.

Fig. 2 is a vertical section taken through the device.

Fig. 3 is a plan view, including a horizontal section along the plane III—III of Fig. 2.

Fig. 4 is a transverse section taken along the plane IV—IV of Fig. 2.

Fig. 5 is an enlarged sectional view taken through a portion of the drive mechanism.

Fig. 6 is a wiring diagram, diagrammatically showing the location and arrangement of certain parts embodied in the device.

Fig. 7 is a plan view of mixing or beating devices which may be employed.

In the embodiment specifically illustrated herein, a base is indicated at 1, this base carrying a rotatable bowl support 2 adapted to hold a bowl or other container 3. Pivotally mounted upon the base 1 is a drive housing including a vertically extending drive housing portion 4 and a horizontally extending portion 5. A motor 6 is shown attached to the drive housing as by means of a bracket 7. A protecting hood 8 covers the bowl during operation. A master control switch is indicated at 9.

By referring to Figs. 2, 3 and 4, it will be seen that the base 1 is hollow and includes an upper portion 10 and a removable bottom plate 11. The bottom plate may be provided with a central boss 12 adapted to receive a spindle 13 carried by the rotatable support 2. In some instances it may be desirable to permit the support 2 to roll on a plurality of small pivoted rollers 14 carried by the sides of the base 1.

Means may be provided for holding the bowl 3 upon the support 2. Although various types of releasable bowl clamping means may be used, the form shown in Fig. 2 has been found very effective and comprises three circumferentially arranged clamping means each consisting of a bracket 15 attached to the support 2, and a hooked latch 16 adapted to engage the edge of the bowl by reason of a compression spring 17 carried by the lower end of the latch 16. A finger hook 18 may be provided for facilitating the release of the clamping means from the bowl 3. The base 1 may be provided with a pair of upstanding brackets 20 and 21 provided with aligned bores, each bracket carrying in its bore a trunnion pin such as the pins 22 and 23. The drive housing 4 is trunnioned upon the pins 22 and 23 for pivotal movement. Attached to the lower portion of the drive housing 4 is a drive bracket 24. In order to prevent the drive housing 4 from moving out of the operative position shown in Fig. 2, a tilt lock 25 is provided, said tilt lock being pivotally carried by the upper plate 10 of the housing 1 and having a handle, generally indicated at 26 (Fig. 1), whereby the lock may be released and the entire housing pivoted upon the trunnion pins 22 and 23 into the position partly indicated in dotted lines in Fig. 2. It is to be understood that the releasable locking means for holding the drive housing in operative position may be varied in its construction from that specifically illustrated herein, and needs not cooperate with a drive bracket 24 but instead may engage any portion of the movable drive housing.

A drive shaft is carried within the drive housing 4 and means are provided for translating the rotation of such drive shaft into a reciprocating motion by actuating rods extending into or immediately above the bowl 3. These actuating rods are shown at 27 in Fig. 2 and it will be noted that each of said rods 27 and 27' is slidably mounted within a bushing 28 carried by the head of the drive portion 5. The actuating rods 27 and 27' are laterally spaced. The top of each of the bushings 28 may be provided with a removable plug 29. A longitudinally extending slot 30 is formed in each bushing, said slot being adapted to accommodate a lug 31 carried by the actuating rod 27. The upper ends of rods 27 extend slightly beyond the end of slot 30 at the top of the stroke, as best shown by 27' in Fig. 2, the air within the upper end of the bushing then acting as a cushion.

The lug 31 may be attached as by means of a link 32 to a lever arm 33 pivoted at 34. Pivotal movement of the arm 33 is obtained by means of an eccentric rod 35 pivotally connected to the lever arm 33 as at 36. The rod 35 cooperates with an eccentric 37 mounted upon a drive shaft 38 journaled in suitable bearings 40 and 41 carried by the drive housing 4, within the bosses through which the trunnion pins 22 and 23 extend (see Fig. 4). In this manner, the drive shaft 38 has its axis coincidental with the pivotal axis of the housing 4.

It is to be understood that like parts pertaining to the driving arrangement between the other actuating rod 27' and the drive shaft 38 are identified by like prime numerals.

Positioned between the eccentrics 37 and 37' is a worm gear 45 in operative engagement with a worm 46 carried by the motor shaft 47 of the motor 6. It will thus be seen that release of the locking means 25 by operating the handle 26 will permit the entire drive housing together with the motor to pivot around a horizontal axis so as to raise the tools carried by the lower portions of the actuating rods from the bowl 3, without breaking the driving engagement between the motor and the driving mechanism.

In some instances it is highly desirable that the support 2 be positively driven or rotated so as to permit the entire contents of the bowl 3 to be subjected to the action of the chopping knives or other tools carried by the actuating rods 27. One form of means for automatically driving the support 2 is shown in the drawings and comprises a short jack shaft 50 extending through the drive bracket 24. A worm gearing, generally indicated at 51, connects this jack shaft 50 with the driven shaft 38. The lower end of the jack shaft 50 may have a bevel gear connection, indicated at 52, with a shaft 53 journaled within the base 1, the shaft 53 carrying a faced driving wheel 54 bearing against the lower surface of the support 2. The gearing 51 and 52 may act as reduction gearing, thereby causing the support 2 to rotate slowly in comparison with the movement of the actuating rods 27.

The lower ends of actuating rods 27 may be provided with removable holders 55 for various tools. A chopping knife 56 is shown attached to the holder 55 and it will be noted that the holder 55 is resiliently and yieldably attached to the end of the rod 27 by means of an internally threaded cap 57 having an inwardly extending lip adapted to abut a shoulder 58 formed near the end of rod 27. The extreme end of the rod 27 may be square or rectangular in cross section, as indicated at 59, and may slidably extend into a square or rectangular bore formed in the holder 55. A spring 60 may surround the portion 59 of the rod 27, said spring normally tending to maintain the cap 57 in contact with the shoulder 58. It will be evident, however, that in the event a bone or other indestructible object is placed in the bowl 3, the slidable and resilient connection between the holder 55 and the rod 27 will permit the chopping knife 56 to strike the bone but will not impose the entire load upon the lever arms 33. Breakage of the machine due to the presence of indestructible objects in the bowl is thus eliminated.

The resilient connection between the tool holder and the reciprocating actuating rod 27 is also of considerable value in making certain that the chopper or knife 56 strikes the food stuffs within the bowl with considerable force so as to positively chop and sever the same. The high downward velocity of the rod 27 may actually compress the spring 60 within the holder 55 but as the rod 27 reaches its lowermost limit of travel, the spring 60 will cause the knife to continue traveling downwardly at substantially the maximum velocity of the rod 27, so that the decrease in velocity at the bottom of each chopping cycle which is normally present in the reciprocating rod 27 is not evident in the action of the chopping knives 56, or other tools attached to the holder 55.

While the machine is in operation it is desirable to employ a removable protecting hood 8 capable of fitting about and being attached to the lower portion of the head of the drive housing 5. It is to be understood, however, that the use of the hood 8 is optional.

The wiring diagram shows that the circuit is closed whenever the main actuating switch 9 is closed provided, however, that the safety switch 70 is also closed. The switch 70 is a small contact switch carried by the base 1 near the pivotal point of the drive housing 4, this switch being closed whenever the drive housing is actually in operative position. If desired, such safety switch 70 may be operated by the locking means 25 so that the machine will not operate whenever the locking switch 25 is open or whenever the drive housing 4 is in a pivoted or tilted position. By thus automatically breaking the circuit whenever the drive housing is tilted or lock 25 released, injury to the operator is prevented.

Although various types of tools may be used instead of the chopping knives, one form of beaters is shown in Fig. 7. The actuating rods 27 and 27' may carry yieldingly contractable holders and to each of these there may be attached a member 72 provided with a plurality of horizontally extending fingers 73, 74, and the like, these fingers extending in the direction of the adjacent actuating rod, the fingers of one device extending between the fingers of the adjoining device, as is evident in Fig. 7. Vertical reciprocation of the actuating rods will therefore move the fingers into and out of engagement, effectively beating or whipping the contents of the bowl. If it is desired to employ the device as an ice crusher, the actuating rods may be provided with downwardly directed pointed attachments capable of piercing and breaking up large pieces of ice.

In some instances it may be desirable to apply an attachment comprising a rack gear extending longitudinally of each of the actuating rods, the rest of the attachment being relatively stationary and being held by the bottom portion of the drive housing or head 5. This attachment may include a bevel drive gearing and a pinion gear engaging the rack on the actuating rods, the reciprocating motion of the actuating rods being thus converted into a reciprocating rotation of suitable beater elements.

It is further to be noted that the arrangement and construction of the device is extremely simple, facilitating production of the units with minimum cost.

It is to be understood that numerous changes and modifications can be made without departing from the present invention. The precise arrangement and location of the motor and driving elements, as well as the driving connection between the driven shaft and the reciprocating actuating rod 27 may be materially changed. Any means for translating the rotation of a driving shaft into reciprocating action of the actuating rods may be employed but the construction shown has been found to be both simple and effective. Instead of employing eccentrics on the drive shaft 38, other cams such as triangular cams may be mounted on such shaft, these cams operating within suitably formed cages in the ends of the eccentric rod. A reciprocating motion differing somewhat in its velocity characteristics may thus be imparted to the eccentric rods, lever arms and actuating rods.

All changes and modifications coming within the scope of the appended claims are embraced thereby.

We claim:

1. A portable food preparing device comprising: a base, a bowl support on said base, a drive housing on said base mounted for pivotal movement about a horizontal axis, said drive housing extending above said bowl support, a pair of laterally spaced vertically reciprocable actuating rods in said housing above said support, a drive shaft in the lower portion of said housing, means for translating rotation of said shaft into reciprocating action of said actuating rods, a motor operably connected to said shaft, and releasable locking means carried by the base for holding said drive housing in operative position.

2. A portable food preparing device comprising: a base, a bowl support on said base, a drive housing on said base mounted for pivotal movement about a horizontal axis, said drive housing extending upwardly and then horizontally above said bowl support, a pair of laterally spaced vertically reciprocable actuating rods in said housing above said support, a yieldingly contractable holder attached to the lower end of each of said rods, a drive shaft in the lower portion of said housing, means for translating rotation of said shaft into reciprocating action of said actuating rods, a motor operably connected to said shaft, releasable lock means for holding said drive housing in operative position, and means for breaking a circuit to said motor when said housing is tilted on said horizontal axis.

3. A portable food preparing device comprising: a base, a bowl support on said base, a drive housing on said base mounted for pivotal movement about a horizontal axis, said drive housing extending above said bowl support, a pair of laterally spaced vertically reciprocable actuating rods in said housing above said support, a drive shaft in said housing with its axis coincidental with the pivotal axis of said housing, means for translating rotation of said shaft into reciprocating action of said actuating rods, a motor operably connected to said shaft, and releasable lock means for holding said drive housing in operative position.

4. A portable food preparing device comprising a hollow base, a rotatable bowl support carried by the base, a drive housing on said base mounted for pivotal movement about a horizontal axis, said drive housing extending upwardly and then horizontally above said bowl support, a pair of laterally spaced vertically reciprocable actuating rods in said housing above said support, a yieldingly contractable holder attached to the lower end of each of said rods, a drive shaft in said housing with its axis coincidental with the pivotal axis of said housing, means for translating rotation of said shaft into reciprocating action of said actuating rods, a motor operably connected to said shaft, and releasable lock means carried by the base for holding said drive housing in operative position.

5. A portable food preparing device comprising a hollow base, a rotatable bowl support carried by the base, a drive housing on said base mounted for pivotal movement about a horizontal axis, said drive housing extending above said bowl support, a pair of laterally spaced vertically reciprocable actuating rods in said housing above said support, a drive shaft in said housing, means for translating rotation of said shaft into reciprocating action of said actuating rods including a pair of laterally spaced eccentrics on said shaft, an eccentric arm driven by each eccentric, and a pivoted lever arm connecting each eccentric arm with a reciprocable actuating rod; a motor operably connected to said shaft, and releasable lock means for holding said drive housing in operative position.

6. A portable food preparing device comprising a hollow base, a rotatable bowl support carried by the base, a drive housing on said base mounted for pivotal movement about a horizontal axis, said drive housing extending above said bowl support, a pair of laterally spaced vertically reciprocable actuating rods in said housing above said support, a drive shaft in said housing with its axis coincidental with the pivotal axis of said housing, means for translating rotation of said shaft into reciprocating action of said actuating rods including a pair of laterally spaced eccentrics on said shaft, an eccentric arm driven by each eccentric, and a pivoted lever arm connecting each eccentric arm with a reciprocable actuating rod; a motor operably connected to said shaft, releasable lock means for holding said drive housing in operative position, and means for breaking a circuit to said motor when said housing is tilted on said horizontal axis.

7. In a portable food preparing device, the combination of a base; a bowl supported on said base, a drive housing on said base mounted for pivotal movement about a horizontal axis, said drive housing extending upwardly and then horizontally above said bowl support; a pair of laterally spaced vertically extending bushings in the housing above said support, each of said bushings being closed at its upper end; a vertically reciprocable rod in each of said bushings, each rod being provided with a lug extending through a slot in its bushing, a drive shaft in the lower portion of said housing, means for translating rotation of the drive shaft into reciprocating action of said rods and connected to said lugs, and a yieldingly contractable holder attached to the lower end of each of said rods in operative relation to a bowl on said support.

ELSIE MEYER.
JOHN BRAUNWALDER.